(12) United States Patent
Heitner

(10) Patent No.: US 7,451,994 B2
(45) Date of Patent: Nov. 18, 2008

(54) APPARATUS AND METHOD FOR STABILIZING A MOTORCYCLE DURING TURNING MANEUVERS

(76) Inventor: Nevin Heitner, 1526 Ben Franklin Hwy., Douglassville, PA (US) 19518-1936

( * ) Notice: Subject to any disclaimer, the term of this patent is extended or adjusted under 35 U.S.C. 154(b) by 5 days.

(21) Appl. No.: 10/923,287

(22) Filed: Aug. 20, 2004

(65) Prior Publication Data

US 2005/0212254 A1   Sep. 29, 2005

Related U.S. Application Data

(60) Provisional application No. 60/556,639, filed on Mar. 26, 2004.

(51) Int. Cl.
*B62J 27/00* (2006.01)
(52) U.S. Cl. .................. 280/304.3; 280/293; 280/288.4; 280/763.1
(58) Field of Classification Search .............. 280/304.3, 280/293, 288.4, 763.1
See application file for complete search history.

(56) References Cited

U.S. PATENT DOCUMENTS

| | | | | |
|---|---|---|---|---|
| 3,700,059 A * | 10/1972 | Sutton | ........................ | 180/209 |
| 4,133,402 A * | 1/1979 | Soo Hoo | ...................... | 180/209 |
| 4,181,190 A * | 1/1980 | Yang | .......................... | 180/219 |
| 4,203,500 A * | 5/1980 | Kamiya | ...................... | 180/219 |
| 4,691,798 A | 9/1987 | Engelbach | .................. | 180/209 |
| 6,022,037 A | 2/2000 | Code | .......................... | 280/303 |
| 6,213,237 B1 | 4/2001 | Willman | ..................... | 180/209 |
| 6,237,930 B1 | 5/2001 | Code | .......................... | 280/303 |
| 6,296,266 B1 * | 10/2001 | Martin | ....................... | 280/293 |
| 6,942,053 B2 * | 9/2005 | Hinton | ....................... | 180/209 |
| 2004/0195800 A1 * | 10/2004 | Mullins | ..................... | 280/293 |
| 2004/0256835 A1 * | 12/2004 | Royal et al. | ................. | 280/293 |

* cited by examiner

*Primary Examiner*—Lesley D. Morris
*Assistant Examiner*—Marlon A Arce Diaz
(74) *Attorney, Agent, or Firm*—Rudoler & DeRosa LLC

(57) ABSTRACT

A method and apparatus and for stabilizing a motorcycle or similar two wheeled, single tread vehicle during turning maneuvers incorporating at least one support member connected laterally and extending outwards from a side of the motorcycle frame. The distal end of each support member comprises a type of contact point for providing contact with the road surface. The length and angle from the motorcycle of each support member may be adjustable in order to control the lean angle of the motorcycle for more safe and confident turning maneuvers at various speeds and corner radii. In addition, the support members are non-cumbersome allowing normal operation of a motorcycle, and provide safety features that reduce both the possibility of having an accident and the seriousness of certain "unavoidable" crashes.

46 Claims, 6 Drawing Sheets

APPARATUS AND METHOD FOR STABILIZING A MOTORCYCLE DURING TURNING MANEUVERS

CROSS-REFERENCE TO RELATED APPLICATIONS

The present application claims the benefit of U.S. Provisional Application No. 60/556,639 filed on Mar. 26, 2004, which is incorporated herein by reference

STATEMENT REGARDING FEDERALLY SPONSORED RESEARCH OR DEVELOPMENT

The present invention was not developed with the use of any Federal Funds, but was developed independently by the inventor.

BACKGROUND OF THE INVENTION

Motorcycles (and other two-wheeled, single tread vehicles) are very maneuverable and can be ridden at high speeds; however, these vehicles are inherently less stable than automobiles and other vehicles having more than two wheels. The speed and quick turning capability that motorcycles provide comprise a primary reason for the popular enjoyment of motorcycling; much of the allure of motorcycling is the freedom and "open individuality" that it bestows on the rider. The mechanical simplicity of the motorcycle form and the absolute responsibility of riders for safety and performance are additional attractions for riding.

Moreover, each motorcycle rider must balance the benefits of riding with the risks associated with the freedom and openness of the motorcycle. The Motorcycle Safety Foundation (MSF) teaches that motorcycling risks cannot be eliminated; however, they can and should be understood and managed in order to minimize such risks. The MSF uses the mantra, Scan, Identify, Predict, Decide and Execute (SIPDE) for each motorcycle rider to practice.

In riding a motorcycle, one of the most difficult aspects to learn is how to set the proper lean angle of the motorcycle to successfully navigate through a corner. A motorcycle must be leaned through an angle into the corner to balance the centrifugal force acting horizontally outwards on the motorcycle. At higher turning speeds the rider must increase the lean angle of the motorcycle into the corner in order to balance the increasing centrifugal force.

As used herein, the term "lean angle" is measured from the vertical position. A smaller lean angle is therefore closer to vertical and a greater lean angle is close to horizontal.

If the motorcycle's lean angle is too small (i.e. more vertical), the motorcycle will become unstable and topple over towards the outside of the corner. If the motorcycle's lean angle is too great (i.e. more horizontal), the motorcycle's tires will lose traction and the motorcycle will slide out from beneath the rider. It is of great importance that the rider learn the correct, safe lean angle for a corner; thus there is a need for an apparatus to control and set the lean angle for the rider.

Turning is the most difficult maneuver to control and execute when riding a motorcycle. A lack of confidence, education, training and experience can make turning more difficult and dangerous. Reports compiled regarding motorcycle accidents indicate that a high percentage of motorcycle accidents are single-vehicle accidents in which the motorcycle rider lost control and crashed without influence of another vehicle or obstacle. Many of these accidents occur while a motorcycle rider is attempting to navigate through a corner and tire traction is lost. Turning accidents can be caused by entering the corner too fast, exhibiting too much of a lean angle for the corner, locking the brakes, or a combination of these factors. Accidents can also happen when another traffic vehicle turns directly in front of an oncoming motorcycle causing the motorcycle rider to make an emergency turning and/or braking maneuver to avoid a collision. The possible outcomes of these accidents can include an off-road excursion, a collision, a "lowside" crash or a "highside" crash.

A "lowside crash" occurs as a result of one of two scenarios: 1) when the front and/or rear tire traction is lost due to too great of a lean angle in a corner, or 2) when the rear brake is "locked-up" in a corner, rear tire traction is lost thus swinging the rear of the motorcycle out of line towards the outside of the corner. In both of these scenarios the side of the motorcycle leaning into the corner slides down into the road surface, impolitely "dumping" the rider off of the "lowside" of the motorcycle and sliding the motorcycle.

A "highside" crash occurs as a result of one of three scenarios: 1) when the front brake is "locked-up" and held, 2) when the rear brake is "locked-up" in a corner, rear tire traction is lost thus swinging the rear of the motorcycle out of line and then the rear brake is suddenly released, and 3) when the rear tire traction is lost in a corner due to too great a lean angle, and the throttle is suddenly "rolled-off". In the first scenario the front tire tucks in and under the motorcycle viciously throwing the rider up and over the "highside" of the motorcycle and "cartwheeling" the motorcycle. In the last two scenarios the sudden regain of rear tire traction results in a large reaction force that quickly "flips" the motorcycle up to the vertical and over, viciously throwing the rider up and over the "highside" of the motorcycle towards the outside of the corner and "body-rolling" the motorcycle.

To safely and successfully navigate through a corner the rider must employ the MSF mantra of Scan, Identify, Predict, Decide and Execute (SIPDE) so that the proper motorcycle speed and lean angle can be judged and set prior to the corner. Often though, for a motorcycle rider to avoid an accident, the rider must execute a tight turning maneuver very quickly. Such a turning maneuver is dependent upon the quickness of the steering initiative and the lean angle achieved by the motorcycle.

As previously noted, to achieve a left hand turning maneuver the rider must lean to the left or inside of the motorcycle. In order for the rider to get to the left side of the motorcycle, the rider must turn the motorcycle handlebars to the right. This is accomplished by the rider pushing out on (or pointing) the left handlebar. Because the handlebars are turned to the right to initiate a left turning maneuver, this process is referred to as "countersteering." This rider input causes the rider to lean to the left, and as this happens the front wheel and motorcycle quickly and automatically turn to the left thus setting the turning radius based on the motorcycle lean angle. This process, though seeming counterintuitive, is best learned and remembered by the saying, "push (point) left, go left; push (point) right, go right".

Thus the lean angle of the motorcycle as it enters and navigates through a corner is crucial to the tightness of the turning maneuver and whether the corner can be executed without an accident. The maximum lean angle is the maximum angle at which the motorcycle can lean from the vertical without the tires losing traction with the road surface. The maximum lean angle depends on the motorcycle speed, required turning radius, the centrifugal force/weight on each tire, tire material, (i.e., the material's coefficient of friction,) and the contour and coefficient of friction of the road surface.

Generally, for safety reasons during normal turning maneuvers, a motorcycle rider will use a lean angle that is significantly less than the maximum lean angle; however, during emergency maneuvers, a tighter turning radius may be required. To achieve the tighter turning radius, the motorcycle rider must set a lean angle closer to the maximum lean angle, without exceeding it.

In professional motorcycle road racing conducted by definition on asphalt-paved circuits, the speed by which racers execute turning maneuvers is an important factor in determining the winner. On certain road race circuits, this factor is even more important than the horsepower of the motorcycle engine.

Motorcycle racers aggressively "countersteer" and lean far off the motorcycle seat into the corner, which is referred to as "hanging-off". As noted previously, leaning into the corner helps counteract the centrifugal forces pushing the motorcycle to the outside of the corner. Because of the additional (racer) weight brought to bear on the inside of the motorcycle, "hanging-off" allows the motorcycle lean angle to be decreased and thus provide additional tire traction to navigate the same turning radius as a turning maneuver executed with the racer sitting in line with the lean angle of the motorcycle. The use of this additional tire traction allows the motorcycle to better navigate the tight corners without losing tire traction uncontrollably. "Hanging-off" also provides another advantage; racers can judge their lean angle throughout the turning maneuver by touching and feeling the asphalt with a pad attached to their knee. This enables racers to better repeat or gradually increase lean angles for certain corners they have become familiar with.

The best racers have on occasions used their padded knee to even help hold up and/or slightly push up the motorcycle to reduce the lean angle when they sense by experience that rear tire traction is about to be lost. This knee action and/or a carefully applied slight "roll-off" of the throttle reduce the motorcycle lean angle to maintain tire traction and prevent a "lowside" crash.

All dirt track motorcycle racers when turning on dirt tracks, will purposely initiate a severe "countersteering" input to the handlebars, to achieve extremely large motorcycle lean angles to deliberately lose rear tire traction and slide the rear motorcycle tire towards the outside of the corner. This maneuver turns the motorcycle to a direction pointing out of the corner more quickly, widens the track of the motorcycle through the corner and allows a racer to "roll-on" the throttle quicker, i.e., move into and out of the corner more quickly. Racers on dirt tracks "plant" the heel of their inside foot outwards and into the loose dirt as a stabilizing, weighted support member while they wrestle the motorcycle to the extreme maximum lean angle. This technique is referred to as "squaring-off" the corner. This exact technique cannot be used on asphalt (road race) surfaces with motorcycles because of the hazard of a "lowside" or "highside" crash and the danger of using one's foot as a weighted support member on hard asphalt.

The best professional road racers who have experience dirt track racing do occasionally attempt to accomplish some "squaring-off" of a corner on asphalt by purposely "rolling-on" or applying more throttle to "break" or lose rear tire traction. This is referred to as "throttlesteering" because the throttle is employed to slide out the rear tire to help steer the motorcycle rather than only relying on only "countersteering" and lean angle. This is accomplished without the placement of the foot or knee on the asphalt for weighted support. "Throttlesteering" realizes some of the benefits associated with "squaring-off", but it creates a much more dangerous scenario. Once the motorcycle begins sliding it becomes basically uncontrollable and liable to crash. The crash will be a "lowside" crash if too much throttle "roll-on" is applied and too great a lean angle results; or the crash will be a "highside" crash if traction is regained too quickly by means of braking or "rolling-off" of the throttle.

In order to regain traction and prevent a "lowside" crash without causing a more horrific "highside" crash, the racer must execute immediate, almost instinctive, maneuvers such as body repositioning and/or a carefully applied slight "roll-off" of the throttle. Often, if lucky, the racer may regain both traction and control after only an upsetting "wiggle & shake" of the motorcycle. This "wiggle & shake" is the beginning of the "highside" action, and may pitch the racer up from the seat and foot pegs and causes the motorcycle to divert from the path along which it had been traveling.

In any case, controlling a motorcycle to successfully regain rear tire traction while executing a turning maneuver is one of the most difficult challenges either on the racetrack or the street. The description of this present invention will include discussions regarding apparatus and method for prevention and solution of this matter.

DESCRIPTION OF THE RELATED ART

There have been many attempts to improve the stability of motorcycles or similar two-wheeled, single tread vehicles. Some of the methods have incorporated additional wheels to stabilize the ride and prevent accidents from occurring during turning maneuvers. Such devices have included bulky frame structures with wheels, often called "outriggers". These outriggers, though some are fixed and some adjustable, do not allow the rider to experiment and practice setting different motorcycle lean angles and then employ the rider-proven lean angles on the public streets and highways. Some devices include sensors which automatically prevent motorcycle "tipovers" by an on-board computer deploying and adjusting the outrigger structures to keep the main two wheels of the motorcycle in rolling contact with the road.

The outrigger-type frame stabilizers have had some effectiveness in preventing accidents and teaching proper turning techniques; however, they are cumbersome and their bulkiness causes a loss of the sensation of being on a motorcycle. In addition, the weight of these mechanisms prevents a motorcycle so equipped from reaching the speeds and maneuverability normally associated with motorcycles. Also, due to the complexity and number of different components required of these devices, the associated purchase and installation costs may be prohibitive especially since one reason for the popularity of motorcycles is their inexpensive purchase and maintenance costs (as compared to automobiles).

In summary, there is nothing in prior art that empowers the motorcycle rider to set different lean angles in order to practice, learn and better execute progressively greater lean angles that will enable the motorcycle to utilize the maximum traction available in safely navigating a corner. Nothing in prior art provides the progressive learning tool that can directly translate into increased rider confidence and safety with its use on the streets and highways.

BRIEF SUMMARY OF THE INVENTION

The present invention comprises a method and apparatus for stabilizing a motorcycle or similar two-wheeled, single tread vehicle during turning maneuvers. The generic term for the present invention is a Motorcycle Turning Stabilization System (MTTS). In one embodiment of the invention, the apparatus includes at least one support member connected laterally and extending outwards from each side of the motorcycle frame, which may contact the road surface during turning maneuvers to stabilize the motorcycle. By employing the apparatus with the greatest possible lean angle set less than the maximum lean angle of the motorcycle, the motorcycle rider can more confidently navigate through a corner without an off-road excursion, collision, or losing tire traction with the resultant "lowside" or "highside" crash. In the present invention, the support members are non-cumbersome structural pieces with a type of contact point on the distal end, the length and angle of which may be adjusted to set the greatest lean angle desirable; this flexibility allows the rider to experience safer, more confident motorcycle riding without compromised enjoyment.

The lean angle allowed by the position of the support member(s) can be adjusted depending on motorcycle speed, required turning radius, weather conditions, road surface conditions, and type/condition of the tires, among other factors that influence turning maneuvers. The rider can then approach any corner with confidence.

An advanced embodiment of the present invention is the provision of hydraulically activated piston/cylinder assemblies as the support members, thus enabling the rider to adjust the motorcycle lean angle while in motion. Other embodiments include the provision of shock absorbers on the support members to ease the initial contact of the contact point with the road surface.

It is to be understood that the foregoing brief description and the following detailed description are exemplary, but not restrictive of the invention

DETAILED DESCRIPTION OF THE INVENTION

Figure 1:
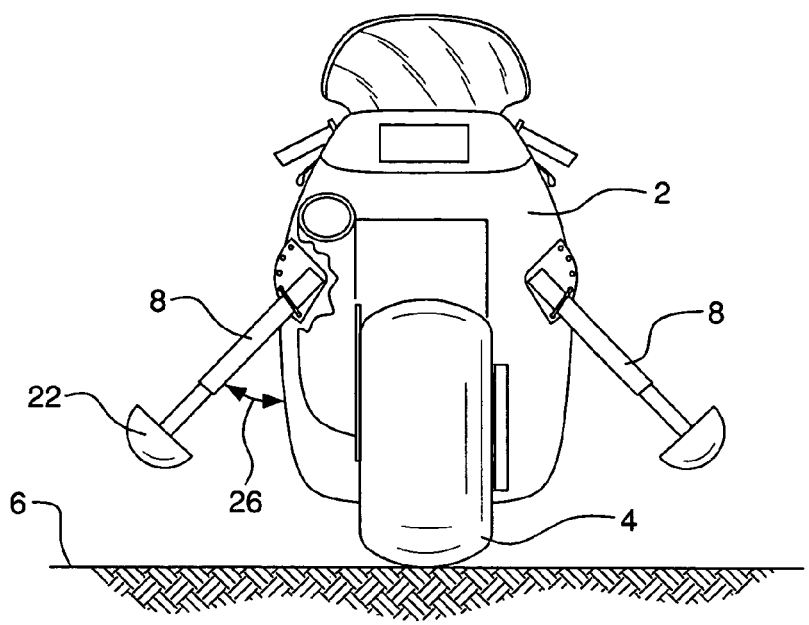
FIG. 1 is a rear view of a motorcycle with the stabilization apparatus of the present invention attached on both sides. The motorcycle is in the vertical (zero lean angle) position.
Figure 2:
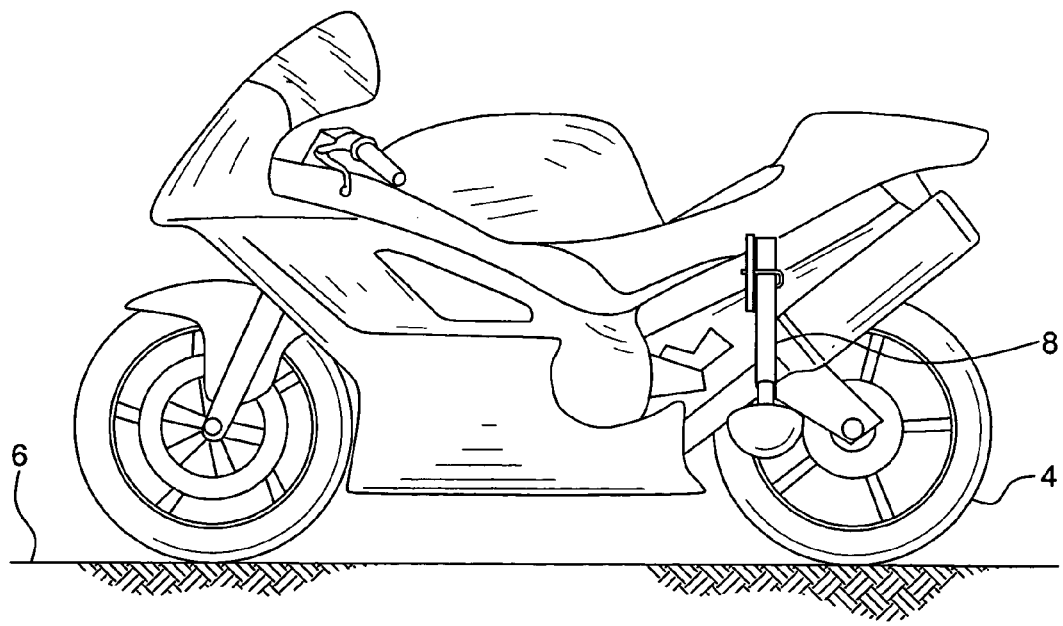
FIG. 2 is a side view of a motorcycle with the stabilization apparatus of the present invention attached at the side of the frame towards the rear.

FIG. 1 is a rear view layout of the main components of a basic version (Version I) of an apparatus for stabilizing a motorcycle or similar two-wheeled, single tread vehicle during turning maneuvers. The motorcycle frame 2 and rear tire 4 are shown in the vertical position from the road surface 6 for reference; the motorcycle lean angle is zero degrees and the support members 8 are extended at an angle 26 from the frame and not in contact with the road surface. Support members 8 are shown on both sides of the frame, although the support member 8 may be attached on only one side. FIG. 2 shows the same motorcycle from the side with the support member attached at the side of the frame towards the rear. In alternate embodiments (not shown) support members may be attached at the side of the frame towards the front, or towards both the front and rear of the frame. The support member can be attached anywhere along the length of the frame.

Figure 3:
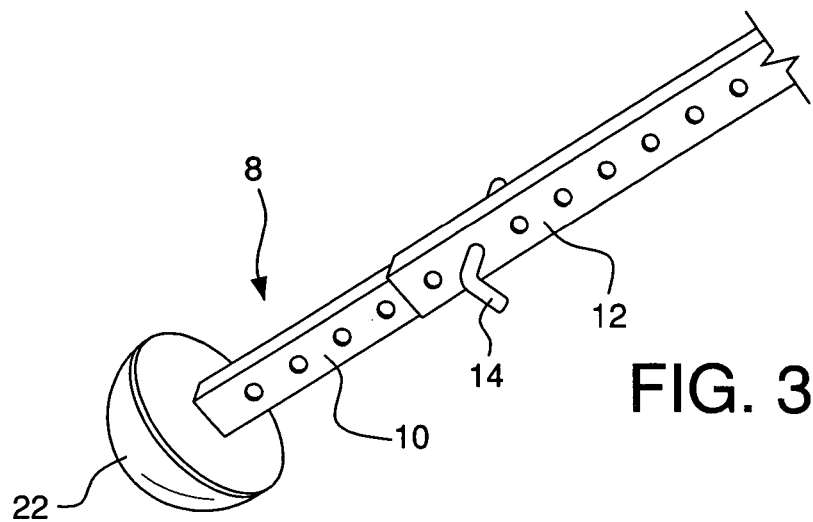
FIG. 3 is a view of a support member with adjustable length.
Figure 4:
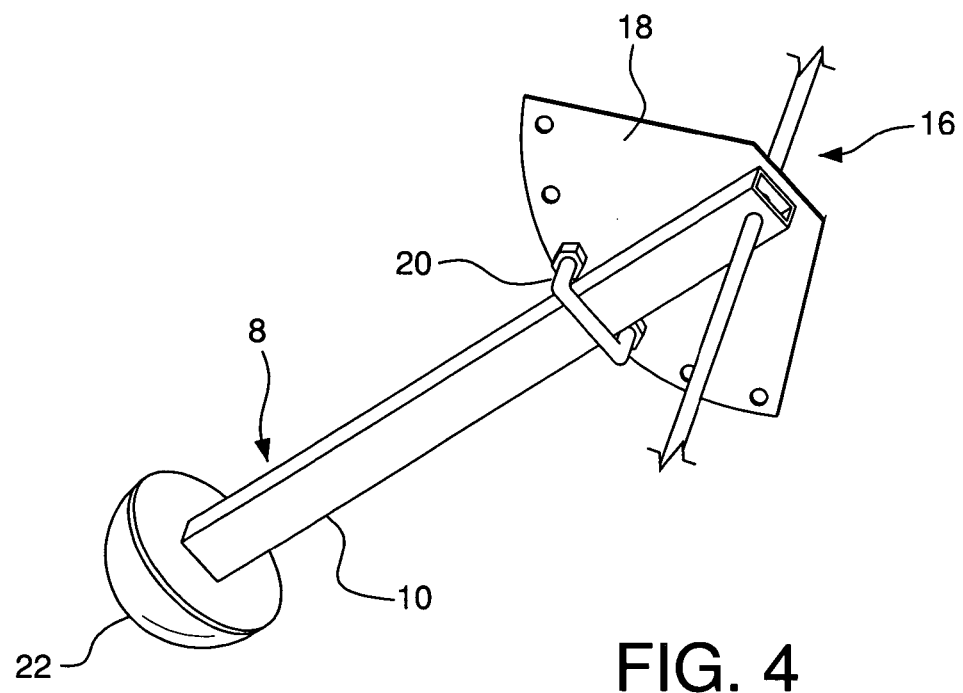
FIG. 4 is a view of a support member with adjustable angle.
Figure 5:
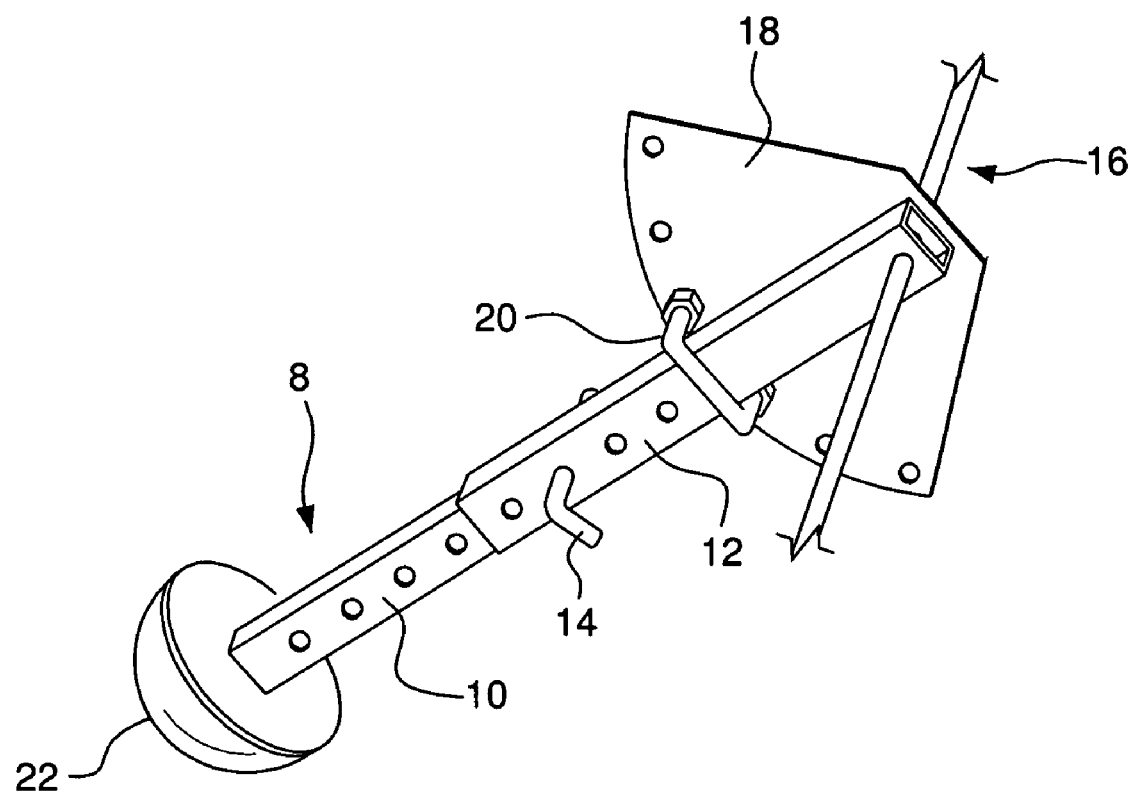
FIG. 5 is a view of a support member with adjustable length and angle.

Version I of the Motorcycle Turning Stabilization System (MTTS) provides manually adjusted support members 8, as shown in FIGS. 3-5. In FIG. 3 the support member 8 consists of a square bar or circular rod 10 that fits within a square tube or cylinder 12. The length of each support member is adjustable by the two pieces 10, 12 longitudinally with respect to each other, aligning holes in both the bar/rod 10 and tube/cylinder 12 and inserting a removable hook pin 14 through both the bar/rod 10 and tube/cylinder 12 assembly. One end of the tube/cylinder 12 is securely attached to the frame of the motorcycle frame 2 (not shown).

FIG. 4 shows an alternative support member 8 of fixed length, which is securely attached to the frame of the motorcycle by means of a fixed pin connection that allows the member 8 to rotate at the pin 16 connection to form varying angles 26 of approximately plus/minus 30 degrees from a 45 degree angle from the motorcycle frame 2 (not shown), although such angles are not meant to limit the scope of the invention. An angle plate 18 and angle set piece 20 allows for varying and setting the angle 26 of the support member 8. The angle plate 18 is attached to the motorcycle frame (not shown). As used herein, adjusting the angle of the support member 8 more accurately means adjusting the angle 26 between the support member 8 and the motorcycle frame (as shown in FIGS. 1 and 6C).

FIG. 5 shows a preferred embodiment of the invention, combining the adjustment mechanisms of FIGS. 3 and 4, so that both the angle and length of the support member 8 are adjustable. In FIGS. 3, 4 and 5 a contact point 22 is firmly attached to the distal end of the support member 8.

While, the length the length of the support member(s) 8 may be set by the insertion of a hook pin as disclosed above; other mechanical means of temporarily fastening the inner and outer support members may be employed. Clamps, screws, bolts, nuts, friction or ratchet mechanisms are other examples. Similarly, the angle of the support member(s) 8 may also be set by the above listed other means in lieu of the angle plate and angle set piece.

In simpler, less costly forms of the invention, the angle 26 between the support member 8 and the motorcycle frame 2 is not adjustable but the length is adjustable, or the length of the support member 8 is not adjustable but the angle 26 between the support member and the motorcycle frame 2 is adjustable. In the simplest, least costly form of the invention, neither the formed angle 26 nor the length of the support member 8 is adjustable. In these embodiments the support member 8 is of a desired fixed length and/or is directly attached to the motorcycle frame 2 forming a desired fixed angle 26.

As described above the support member 8 has a length adjustment mechanism and an angle adjustment mechanism. In some embodiments it may have one or the other. These adjustment mechanisms will be referred to generically herein as an adjustable lean stop. An adjustable lean stop is a device that either adjusts the length of the support member 8 or the angle 26 of the support member 8 with respect to the motorcycle frame 2.

The contact point 22 at the end of the support member 8 can be a pad constructed of pressure-treated leather, plastic, rubber, metal, or any other material having a desirable coefficient of friction and durability. The contact point 22 may be replaceable and/or easily interchanged with pads of other contact materials, depending on the conditions of the motorcycle, road surface, and/or weather conditions. The contact point 22 may alternatively be a wheel or wheels at the end of the support member 8. Such wheels may be heavy duty plastic or metal caster-type wheels, or may be suitable spherical wheels of heavy duty plastic, rubber or metal materials. The type and material employed will determine if the contact point 22 is permanent or need replacement due to wear. In addition, the contact point 22 and the attached adjustable support member 8 may be easily removed for service or intentional non-use. In one embodiment the contact point is not a separate material, but is merely the end of the support member 8, for instance the metal end of the tube bar/rod 10.

Figure 6A:
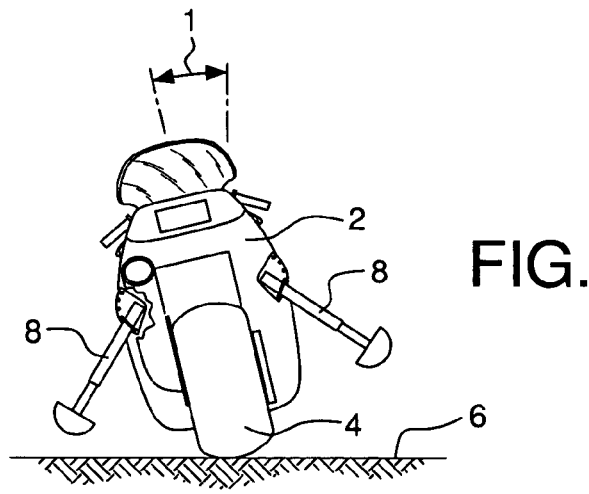
FIG. 6 illustrates different rear views of a motorcycle exhibiting varying lean angles.
Figure 6B:
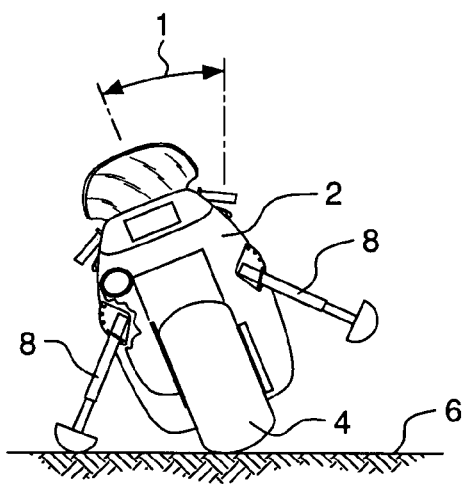
Figure 6C:
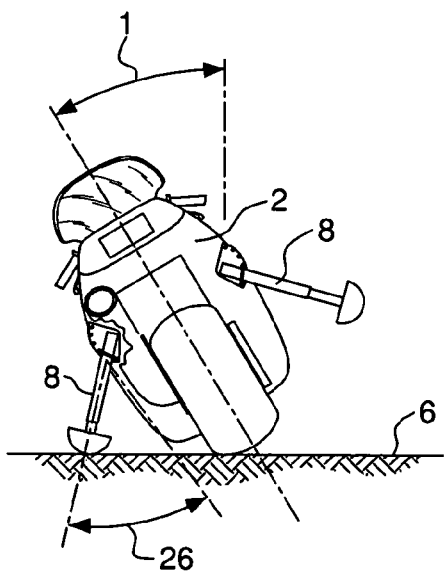

FIG. 6A of the present invention is a rear view of Version I of the Motorcycle Turning Stabilization System (MTTS) with the motorcycle frame 2 and rear tire 4 shown in a left-turning position with the motorcycle lean angle 1 not yet at the greatest lean angle set (adjustable). In FIG. 6B, because the motorcycle lean angle 1 has enabled the contact point 22 to come into contact with the road surface 6 the stability of the motorcycle is assured throughout the turning maneuver. Note that the greatest allowed motorcycle lean angle 1 is preset by the location of the removable hook pin 14 in the bar/rod 10 and tube/cylinder 12 assembly (i.e. the length at the support member) as well as the location of the angle set piece 20 at the angle plate 18 (i.e. the angle of the support member).

By adjusting and setting the motorcycle lean angle, the rider can practice and determine the greatest lean angle he or she is comfortable with, and still be assured that the set lean angle is less than the maximum lean angle of the motorcycle. Thus, if the need arises, the rider can confidently employ the SIPDE mantra to quickly execute tight turns to avoid collisions with an oncoming traffic vehicle or prevent an off-road excursion, collision, "highside" or "lowside" crash. The motorcycle rider can, if needed, employ the greatest lean angle set to navigate through a turning maneuver; or more than likely only use the greatest lean angle set as a lean stop for lean angle judgment and confirmation (similar to the knee of a racer) and then slightly reduce the motorcycle lean angle (straightening up the motorcycle) for the lean angle desired or required.

FIG. 6C illustrates the motorcycle at a greater set lean angle 1 than in FIG. 6B. The lean angle 1 is increased by either decreasing the length of the support member 8 and/or increasing the angle 26 between the lower portion of the motorcycle frame 2 and the support member 8.

An embodiment of the Motorcycle Turning Stabilization System (MTTS) that is not shown for the sake of clarity, is the provision of shock absorbers on the support member 8 consisting of coil springs, liquid/gas damper assemblies or other devices to ease the initial contact of the contact point with the road surface 6, and allow for the contact point 22 to ride more smoothly over contours on the road surface. This embodiment reduces any jarring or bounce of the contact point 22 caused by too harsh of a turning initiative by the rider. If the contact point 22 is made of a material with some compressibility, the contact point 22 may act as a shock absorber.

Figure 7:
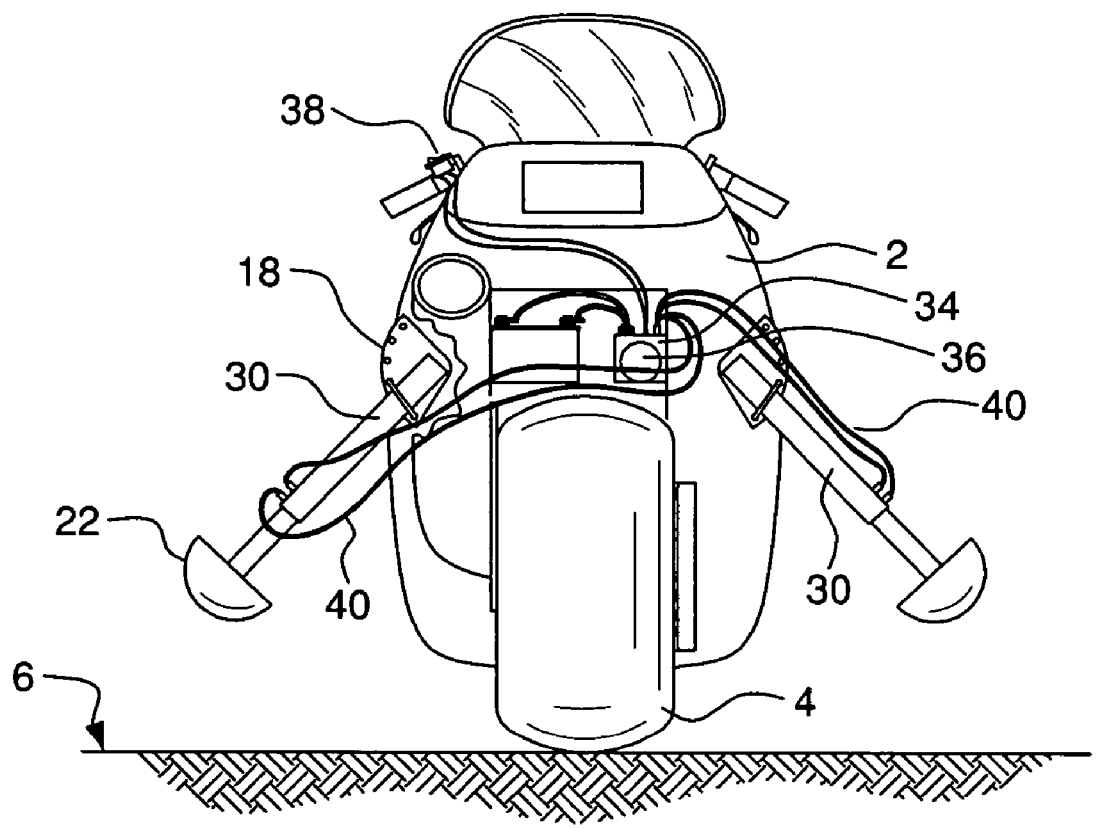
FIG. 7 is a rear view of a motorcycle incorporating a hydraulically activated piston/cylinder assembly controlling the length of the support member(s) via a manual controller on the motorcycle handlebars. The motorcycle is in the vertical (zero lean angle) position.
Figure 8:
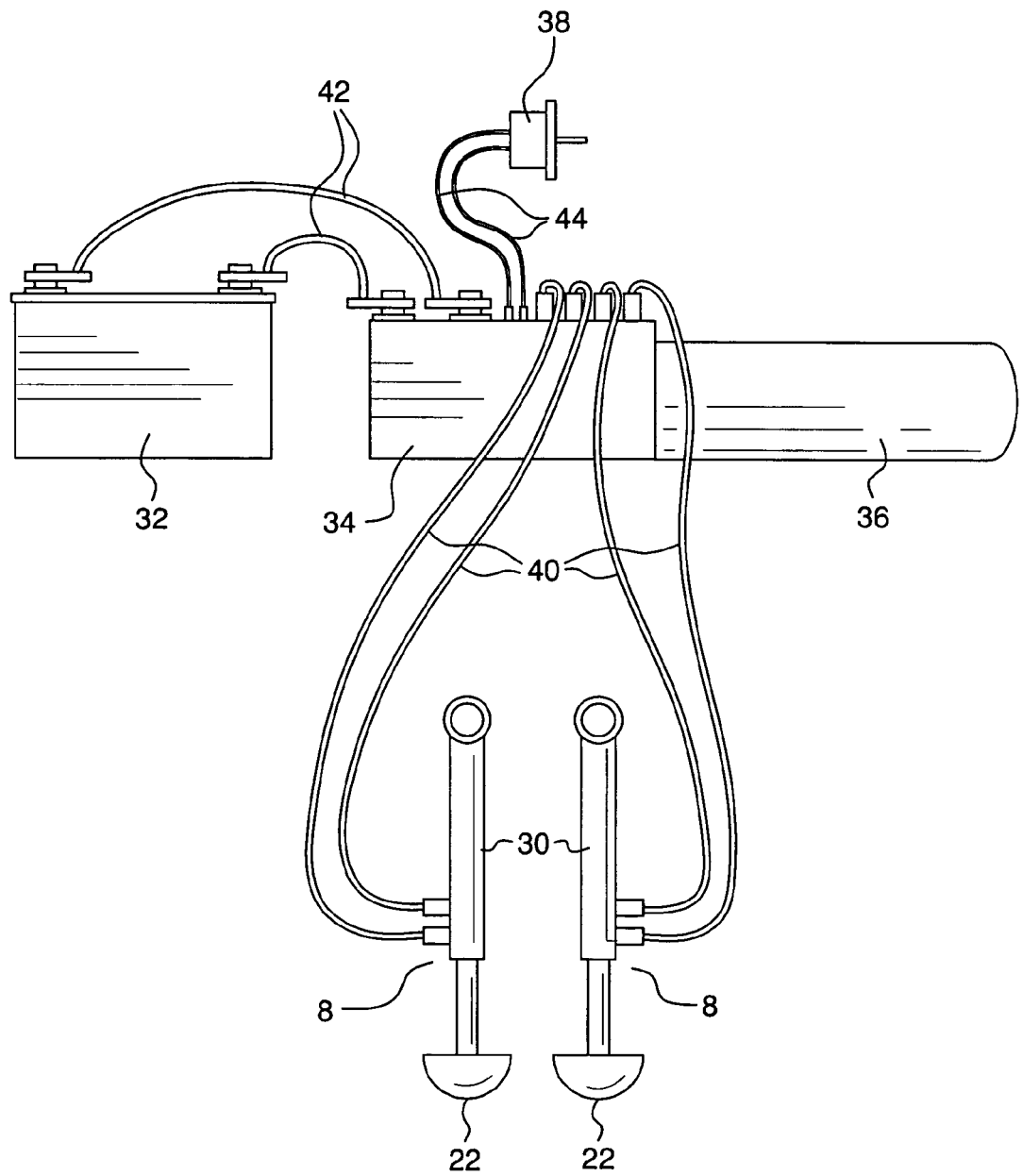
FIG. 8 is a schematic layout of the embodiment shown in FIG. 7.

FIG. 7 is a view of a motorcycle with the main components of Version II of the Motorcycle Turning Stabilization System (MTTS) comprising one of the more advanced embodiments of the present invention. FIG. 8 illustrates a schematic of this version (for clarity, the motorcycle is not shown in this view). As in FIG. 1, FIG. 7 illustrates the motorcycle frame 2 and rear tire 4 in the vertical position from the road surface 6 for reference; the motorcycle lean angle 1 is zero degrees. This advanced embodiment of Version II replaces the bar/rod 10 and tube/cylinder 12 assembly in FIGS. 3 and 5 with a hydraulically activated piston cylinder assembly 30 to control the length of the support member 8. Incremental control of the length of the support member is accomplished via a manual controller 38 on the motorcycle handlebars. FIG. 8 illustrates in greater detail that hydraulic oil lines 40 connect the hydraulic piston cylinder assembly 30 to a hydraulic system reservoir 36 and electrical leads 42 from a battery 32 connect to a hydraulic system pump 34. The manual controller 38 is also connected by electrical wiring 44 to the hydraulic system pump 34. One end of the hydraulic piston cylinder 30 assembly is securely attached to the frame of the motorcycle 2. A contact point 22 is firmly attached to the distal end of the hydraulic piston cylinder assembly 30.

An embodiment of Version II not shown for clarity in FIGS. 7 and 8 is the provision of an additional or alternative set of hydraulically activated piston/cylinder assemblies for incremental control of the angle 26 between the support member 8 and the motorcycle frame 2. This embodiment would be in lieu of the angle plate 18 and angle set piece 20, and would allow the rider additional control to adjust the motorcycle lean angle while in motion. Versions I and II can be combined with the length controlled manually and angle controlled hydraulically, or vice-versa.

While in the disclosed embodiment the system is hydraulic, it could be pneumatic, or electromechanical (including electric, electronic, and variable reluctance actuators) or any other means of power and mechanical control whether now known or herein after invented. In addition, the electric leads 44 from the controller 38 to the pump 34 could be replaced by a wireless remote control or use existing wires/conductive paths on the motorcycle as a carrier. Also, in lieu of a separate battery 32, the motorcycle's battery could be utilized for the power source. The switch 38 need not be just on/off and may have settings and indicators and need not be on the handlebars but could be anywhere on the motorcycle. In an alternative system the length and/or angle of the support member 8 could be controlled remotely from off the motorcycle, for instance, in a race by the pit crew.

Version III or the most advanced embodiment of the present invention is for the control of the greatest motorcycle lean angle to be determined by an on-board or remote computer. Sensors including rate gyros and/or accelerometers can receive continuous information streams to determine if the rate of motorcycle body roll is higher than the range possible when the tires have traction. Thus the microcomputer can sense when the tire slippage is imminent and automatically activate the hydraulic piston/cylinder assembly to adjust (decrease) the motorcycle lean angle to prevent tire slippage and a possible "highside" or "lowside" crash. The benefits of this most advanced embodiment, similar to the benefits of Antilock Braking Systems (ABS), is that control will not be lost due to tire slippage and loss of traction. For motorcycles, even more than for automobiles, this represents a very significant safety feature.

As the present invention of the Motorcycle Turning Stabilization System (MTTS) may be comprised of one or multiple support members attached laterally at the front and/or rear of each side of the motorcycle frame, any combination of different version of support members, with or without shock absorbers, may be employed. One preferred embodiment may be for support members towards the front of the motorcycle frame be similar to Version I (FIGS. 1 through 5) with shock absorbers while support members towards the rear of the motorcycle frame be similar to the more advanced embodiment of Version II (FIGS. 7 and 8) with shock absorbers.

As previously noted, many minor changes of structure and operation could be made without departing from the spirit of the present invention. This may include, but not be limited to, different means of accomplishing the actuation of the support member piston/cylinder assembly other than by hydraulics (such as by electric motors, gears, compressed air, etc.), and different mechanical means of setting the adjustable lean stop.

By the Version II advanced embodiment of the present invention as shown in FIGS. 7 and 8, the rider is empowered with the ability to incrementally control the greatest motorcycle lean angle possible while in motion. It is noted by this inventor that the ability afforded by this advanced embodiment may not be in the best interests of the average rider, who may not be interested or capable of controlling the greatest motorcycle lean angle in motion. For the average rider, the automatic microcomputer-controlled Version III Motorcycle Turning Stabilization System (MTTS) may be preferred, though at extra cost. This version could be offered as an option on motorcycles similar to Anti-lock Braking Systems (ABS) or Linked Braking Systems (LBS) that are offered today in the marketplace.

Version II may appeal to above average riders or riders who also take their motorcycles onto closed track circuits for club related or amateur road racing events. Even then the added confidence and safety of the Version III Motorcycle Turning Stabilization System (MTTS) may appeal to those riders/racers who can afford and justify the additional cost.

For the professional road racer, as most closed circuit tracks comprise of corners with varying radii, width, elevation and road surface and contour, the racer may wish to employ Version II to adjust the motorcycle greatest lean angle for each corner. In addition, as the racer becomes more familiar with the different track corners lap after lap, he or she may gradually increase the greatest motorcycle lean angle at any specific corner. Version II also enables the racer while navigating the corner to decrease the lean angle of the motorcycle by extension of the hydraulically activated piston/cylinder support member assembly via the handlebar controller. This action is similar, though safer and more effective, than using a padded knee to push up the motorcycle to maintain tire traction.

This inventor recognizes three benefits of Version III for the professional road racer. First is that information regarding the motorcycle's operating parameters during turning maneuvers (body roll, tire slippage, etc.) can be fed live to the racer's crew, downloaded and noted for future reference and performance upgrades. This method of data acquisition is already widely utilized in both automobile and motorcycle racing teams though it is primarily related to engine performance parameters. "Live-stream" data is not yet generally used to immediately control vehicle performance (with exceptions regarding anti-lock brakes and anti-roll/yaw active suspensions, though these technologies are not permitted by all governing race organizations).

Second, is that by employing Global Positioning System (GPS) technology, the Version III microcomputer can be programmed to recognize and adjust the greatest lean angle in anticipation of any specific corner. In combination with the sensing of imminent tire slippage, greater lean angles and greater speeds may be realized in corners.

The third benefit associated with Version III of the present invention is that some rear tire slippage could be programmed into the microcomputer, depending on the road racer's preference of turning techniques and the specific corner to be navigated. After the programmed amount of tire slippage is realized, the microcomputer can automatically sense this and slightly decrease the motorcycle lean angle thus "saving" the motorcycle from the dreaded "wiggle & shake" or the worse "lowside" or "highside" crash. This method of "saving" the motorcycle is similar to the racer's use of a knee to push the motorcycle up to reduce the lean angle.

While the invention as described herein has mostly been discussed with respect to motorcycles, it is equally applicable to any two wheeled, single tread vehicle, such as a bicycle. Indeed, the invention is meant to apply to any wheeled vehicle (whether more than or less than two wheels or with multiple treads) where the wheel configuration is such that the vehicle may become unstable during use. For instance, the invention could be applied to training for a unicycle or to prevent automobiles from rolling over. In applications to prevent automobiles from rolling over the support member(s) would be attached and extended from the side of the vehicle facing the outside of the corner; opposite from that of a motorcycle or other two-wheeled, single tread vehicle.

EXAMPLE

Though an embodiment of the present invention may include only one support member per side of a motorcycle (or other two-wheeled, single tread vehicle), in an example of the present invention, this inventor has modified a 1992 Kawasaki EX-500 with provision of the Motorcycle Turning Stabilization System (MTTS) comprising of a Version I support member at the front left of the motorcycle frame, and both a Version I and II support member at the rear left. Extensive testing of the prototype of the present invention included the following process:

While at rest the motorcycle lean angle was set at both front and rear support members at a rather conservative (small) lean angle that the rider was very comfortable with. The motorcycle was then ridden around a closed circular course comprising of left hand corners. As the motorcycle was ridden into the corner and the "countersteering" input initiated by the rider, the motorcycle gently leaned into the corner at the preset greatest lean angle. At this lean angle, with the contact point firmly on the road surface, the motorcycle was very stable throughout the turning maneuver. Afterward several test runs, the rider noted that motorcycle seemed to be safely supported throughout the corner and that the rider was prevented from making any misjudged or unsettling mid-corner turning corrections; that the Motorcycle Turning Stabilization System (MTTS) provided the confidence and ability to execute a perfect turning maneuver.

The motorcycle lean angle was then set at a more aggressive (greater) lean angle that the rider had less riding experience with. In navigating the same course at the same speeds, the resultant tighter turns were again perfectly executed due to the confidence inspired by the contact point securely on the course surface throughout the turning maneuvers. The rider noted, that though this more aggressive lean angle was not generally used on the streets and highways, just gaining the knowledge and experience that the motorcycle could successfully navigate a corner at that lean angle was reassuring; that if the need arose the rider would now feel comfortable executing a tighter turning maneuver with that greatest motorcycle lean angle preset. If the motorcycle lean angle needed to execute such a tighter turning maneuver was less than the greatest motorcycle lean angle (preset), the extra stability of the contact point would not be required; but if the tighter turning maneuver required a greater lean angle; the rider was confident of leaning the motorcycle to the greatest lean angle to execute the tighter turning maneuver.

A last series of testing involved setting the motorcycle lean angle to an aggressive angle close to the motorcycle's maximum lean angle. This involved determination of the lean angle at which the motorcycle may start to slide out in a corner due to tire slippage. The length of the front and rear support members were set for a greatest lean angle slightly less than the motorcycle's estimated maximum lean angle for the corner and the rear support member comprising of the hydraulically activated piston/cylinder assembly was also set for this length via the controller on the handlebars. The rider then rode the motorcycle through the resultant tight turning maneuvers often employing the hydraulically activated piston/cylinder assembly as an aid in righting (towards vertical) the motorcycle as it exited the corners. By this testing the rider understood that if the motorcycle had seemed to start to slide out in the corner, the hydraulically activated piston/cylinder assembly could immediately decrease the motorcycle's lean angle and "save" the motorcycle from a resultant "highside" or "lowside" crash.

By the ability of the present invention to allow for safely testing of a motorcycle at extreme lean angles, the testing of motorcycle components can also be tested with greater safety, and efficiency under better uniform conditions. As variables other than the selected test variable can be maintained constant, a better testing process can be achieved to confirm results. Different types and/or compounds of tires, braking components and suspension components (including shock absorber types and settings) can thus be tested with less risk to the test rider and motorcycle.

Testing of the prototype motorcycle also indicated other advantages of the present invention. The support members on each side of the motorcycle reduce the possibility of a motorcycle rider being pinned under the motorcycle in the case of certain crashes or "fall-overs". The supports can also act as a barrier protecting the rider's legs from a direct hit in a collision with another vehicle. The support members, when fully extended, can also obviate the need for side kickstands because the motorcycle can be rested on the contact points.

An embodiment providing additional safety for the motorcycle rider is that the present invention can incorporate a continuous rail with contact points at the front the rear, such that the rail can provide additional protection to the motorcycle rider. The rail would be perpendicularly attached to the support members which extend laterally out from the frame of the motorcycle.

An additional embodiment providing yet additional safety and convenience is that the support members of Version II or III of the present invention can, either by manual controller or automatically by on-board microcomputer, extend and/or rotate further out and down such that the contact points contact the road surface when the motorcycle is in an upright vertical position at low speeds and/or at rest. This will prevent the need for a rider to place his feet on the ground for balancing the motorcycle.

All of the above safety advantages and embodiments may be able to reduce the incidence and severity of accidents and thereby reduce insurance premiums for motorcycle riders.

Unlike the prior art, the present invention does not "rob" a motorcycle of its two-wheeled "essence"; it does not require additional running tires (unless the contact point is a wheel or tire). It does not require massive, bulky, fixed outriggers that substantially affect to a negative degree the motorcycles appearance, performance and maneuverability. It is not limited to use as only a learning tool to be practiced on closed courses. It is not only an apparatus and method for limiting the lean angle of a motorcycle in a corner; it provides the ability for the rider to adjust the motorcycle lean angle. It not only allows for the gradual increasing of the motorcycle lean angle, but also for the gradual decreasing of the motorcycle lean angle. It not only provides automatic, microcomputer control of the motorcycle lean angle, but can also be programmed for certain lean angles at certain corners as well as to either prevent tire slippage (similar to Anti-lock Braking Systems or ABS) or allow for some tire slippage.

The present invention offers the most simple and inexpensive apparatus and method for a Motorcycle Turning Stabilization System (MTSS). Its simplest embodiment is not cost prohibitive either for integration into a new motorcycle design or as an aftermarket addition. It represents a sweet and simple engineering design that addresses and solves the age-old problem of providing motorcycle stability throughout a turning maneuver.

Most importantly, by the above advantages over related art, the present invention allows even a novice motorcycle rider to safely learn, practice and understand the technique and art of turning a motorcycle. By setting and adjusting the maximum "practiced-and-proven" motorcycle lean angle, the rider can be assured of the turning capability of the motorcycle and be confident, if the need arises, to fully utilize that potential in order to avoid an accident.

By learning and practicing the Motorcycle Safety Foundation's mantra of Scan, Identify, Predict, Decide and Execute (SIPDE), the motorcycle rider is able to manage and reduce the risk inherent to riding a motorcycle. By scanning and identifying an approaching corner in the road, the rider predicts and determines the path, speed and lean angle required to successfully navigate the corner. The rider then executes the turning maneuver at the speed and lean angle decided.

If for some unpredicted reason, the motorcycle's speed is "really hot" or too fast to navigate through the corner and the motorcycle has already been leaned over into the corner, the rider has three available options to avoid an accident. If the rider "rolls-off" of the throttle or applies the brakes, the weight of the motorcycle will shift forward both upsetting the balance of the motorcycle and unloading the rear tire. With less weight on the already leaned-over rear tire and additional rear brake pressure applied, the rear brake has a much greater chance of "locking-up" the wheel and skidding the tire. As previously described, this is usually the condition that causes either a "lowside" or a "highside" crash.

A second option is for the rider to quickly straighten the motorcycle up (by a "countersteering" initiative), brake hard to reduce the motorcycles speed and then reinitiate the turning maneuver. The problem with this option is that there may not be enough road surface in the corner to allow for this maneuver.

The third and best option according to the Motorcycle Safety Foundation's Experienced Rider Course Participant's Handbook (1993), pages 38 & 39 is to further increase the motorcycle's lean angle, without reducing speed. To accomplish this the rider must be aware of the fill turning capability of the motorcycle and familiar with executing a turning maneuver at some greater motorcycle lean angle. This is achieved by an additional "countersteering" input at the handlebars and will result in a tighter turning radius without upsetting the balance of the motorcycle.

Thus the real safety issue is whether the rider is trained and confident to "countersteer" and lean the motorcycle into a lean angle approaching, but yet not exceeding, the motorcycle maximum lean angle during emergency turning maneuvers. Accident reports as well as anecdotal accounts by accident survivors and witnesses tend to support that this is usually not the case. As long as the motorcycle rider practices, determines and sets the greatest comfortable lean angle for the motorcycle, the rider will be able, as the need arises, to confidently make full use of that greatest lean to safely navigate through the corner. The present invention provides the motorcycle rider with an apparatus and method which is both a learning tool and a Motorcycle Turning Stabilization System (MTTS) that empowers the rider to adjust, set and control that greatest lean angle on the street and the track.

While illustrated and described above with reference to certain specific embodiments, the present invention is nevertheless not intended to be limited to the details described and indicated. Rather, the present invention is directed to a non-cumbersome apparatus and method for turning motorcycles or other two-wheeled, single tread vehicles, and various modifications may be made in the details within the scope and range of equivalents of the description and without departing from the spirit of the invention.

I claim:

1. An apparatus for stabilizing a vehicle during turning maneuvers on a road surface comprising:
    a support member attached at one end to the vehicle; and
    a contact point at a second end of the support member, the contact point being adapted to contact a road surface during turning maneuvers;
    wherein the contact point comes into contact with the road surface approximately when the vehicle reaches a greatest desired lean angle;
    wherein when the contact point first contacts the road surface at a first lean angle, the support arm prevents the vehicle from exceeding the first lean angle.

2. The apparatus of claim 1 further comprising an adjustable lean stop for setting the greatest desired lean angle.

3. The apparatus of claim 2 wherein the adjustable lean stop is a length adjustment mechanism.

4. The apparatus of claim 3 wherein the support member comprises an inner member and an outer member that can be adjusted longitudinally with respect to each other to adjust the length of the support member.

5. The apparatus of claim 2 wherein the adjustable lean stop is an angle adjustment mechanism.

6. The apparatus of claim 5 wherein the angle adjustment mechanism is an angle plate.

7. The apparatus of claim 6 wherein the angle is maintained with respect to the vehicle frame with a pressure clamp, set screw, latching key, bolt and nut, or angle set piece.

8. The apparatus of claim 2 wherein the adjustable lean stop is hydraulically, pneumatically or electromechanically controlled.

9. The apparatus of claim 8 further comprised of a manual controller located on the vehicle for controlling the position of the adjustable lean stop.

10. The apparatus of claim 2 further comprising a sensor attached to the vehicle for sensing a physical state of the vehicle.

11. The apparatus of claim 10 further comprising a computer in communication with the sensor and the adjustable lean stop for controlling the position of the adjustable lean stop.

12. The apparatus of claim 1 wherein the contact point comprises of a pad, ball or wheel.

13. The apparatus of claim 1 wherein the contact point comprises rubber, metal or plastic.

14. The apparatus of claim 1 wherein the support member comprises a shock absorber.

15. A vehicle comprising:
    at least one wheel;
    a frame;
    a support member attached at one end to the frame;
    a contact point at a second end of the support member, the contact point being adapted to contact a road surface during turning maneuvers;
    wherein the contact point comes into contact with the road surface approximately when the vehicle reaches a greatest desired lean angle;
    wherein when the contact point first contacts the road surface at a first lean angle, the support arm prevents the vehicle from exceeding the first lean angle.

16. The vehicle of claim 15 further comprising an adjustable lean stop for setting the greatest desired lean angle.

17. The vehicle of claim 16 wherein the adjustable lean stop is a length adjustment mechanism.

18. The vehicle of claim 17 wherein the support member comprises an inner member and an outer member that can be adjusted longitudinally with respect to each other to adjust the length of the support member.

19. The vehicle of claim 18 wherein the inner and outer members are held n place with respect to each other with a pressure clamp, set screw, latching key, bolt and nut, or hook pin.

20. The vehicle of claim 16 wherein the adjustable lean stop is an angle adjustment mechanism.

21. The vehicle of claim 20 wherein the angle adjustment mechanism is an angle plate.

22. The vehicle of claim 21 wherein the angle is maintained with respect to the vehicle frame with a pressure clamp, set screw, latching key, bolt and nut, or angle set piece.

23. The vehicle of claim 16 wherein the adjustable lean stop is hydraulically, pneumatically or electromechanically controlled.

24. The vehicle of claim 23 further comprised of a manual controller located on the vehicle for controlling the position of the adjustable lean stop.

25. The vehicle of claim 16 further comprising a sensor attached to the vehicle for sensing a physical state of the vehicle.

26. The vehicle of claim 25 further comprising a computer in communication with the sensor and the adjustable lean stop for controlling the position of the adjustable lean stop.

27. The vehicle of claim 15 wherein the contact point comprises a pad, ball or wheel.

28. The vehicle of claim 15 wherein the contact point comprises rubber, metal or plastic.

29. The vehicle of claim 15 wherein the support member comprises a shock absorber.

30. The vehicle of claim 15 further comprised of multiple support members, said support members located towards the front and rear of the vehicle.

31. The vehicle of claim 15 further comprised of multiple support members, said support members located on both lateral sides of the vehicle.

32. A method of stabilizing a vehicle during a turning maneuver on a road surface comprising:
    providing a vehicle comprising at least one wheel, a frame, a support member attached at one end to the frame, and a contact point at a second end of the support member, the contact point being adapted to contact a road surface during turning maneuvers, wherein the contact point does not come into contact with the road surface until approximately when the vehicle reaches a preselected greatest desired lean angle, and wherein when the contact point first contacts the road surface at a first lean angle, the support arm prevents the vehicle from exceeding the first lean angle;
    initiating the turning maneuver;

leaning the vehicle until the contact point on an end of a support member attached to the vehicle comes into contact with the road surface; and completing the turning maneuver.

33. The method of claim 32 further comprising the step of adjusting the support member to set the lean angle of the vehicle at which the contact point contacts the road surface.

34. The method of claim 33 wherein the length of the support member is adjusted.

35. The method of claim 33 wherein the angle between the support member and the vehicle frame is adjusted.

36. The method of claim 33 wherein the adjustment is hydraulically, pneumatically or electromechanically controlled.

37. The method of claim 33 wherein the adjustment is controlled manually from onboard the vehicle.

38. The method of claim 33 wherein the adjustment is controlled by a computer in communication with an onboard sensor sensing the physical state of the vehicle.

39. The method of claim 33 wherein the support member is adjusted so that the vehicle lean angle can be set to achieve the greatest desired lean angle to safely stabilize the vehicle during turning maneuvers.

40. The apparatus of claim 1 wherein the contact point does not come into contact with the road surface until approximately when the vehicle reaches the greatest desired lean angle.

41. The apparatus of claim 1 wherein the first lean angle is the greatest desired lean angle.

42. The apparatus of claim 1 wherein the support member extends from the vehicle at a substantially fixed angle.

43. The vehicle of claim 15 wherein the contact point does not come into contact with the road surface until approximately when the vehicle reaches the greatest desired lean angle.

44. The vehicle of claim 15 wherein the first lean angle is the greatest desired lean angle.

45. The apparatus of claim 15 wherein the support member extends from the vehicle at a substantially fixed angle.

46. An apparatus for stabilizing a vehicle during turning maneuvers on a road surface comprising:

a support member attached at one end to the vehicle, the support member comprising an inner member and an outer member that can be adjusted longitudinally with respect to each other to adjust the length of the support member, the inner and outer members being held in place with respect to each other with a pressure clamp, set screw, latching key, bolt and nut, or hook pin;

a contact point at a second end of the support member, the contact point being adapted to contact a road surface during turning maneuvers; and an adjustable lean stop, the adjustable lean stop being a length adjustment mechanism for setting a greatest desired lean angle, wherein the contact point comes into contact with the road surface approximately when the vehicle reaches the greatest desired lean angle.

* * * * *